US009519874B2

United States Patent
Macek et al.

(10) Patent No.: US 9,519,874 B2
(45) Date of Patent: Dec. 13, 2016

(54) HVAC CONTROLLER WITH REGRESSION MODEL TO HELP REDUCE ENERGY CONSUMPTION

(75) Inventors: Karel Macek, Prague (CZ); Karel Marik, Revnice (CZ); Jiri Rojicek, Prague (CZ)

(73) Assignee: Honeywell International Inc., Morris Plains, NJ (US)

( * ) Notice: Subject to any disclaimer, the term of this patent is extended or adjusted under 35 U.S.C. 154(b) by 437 days.

(21) Appl. No.: 13/599,748

(22) Filed: Aug. 30, 2012

(65) Prior Publication Data
US 2014/0067132 A1 Mar. 6, 2014

(51) Int. Cl.
*G05D 23/19* (2006.01)
*G06Q 10/04* (2012.01)
(Continued)

(52) U.S. Cl.
CPC ............ *G06Q 10/04* (2013.01); *F24F 11/006* (2013.01); *G05D 23/1917* (2013.01);
(Continued)

(58) Field of Classification Search
CPC ........ G06Q 10/04; G06Q 50/06; G06Q 10/06; G06Q 30/0283; F24F 11/006; F24F 2011/0058; F24F 2011/0061; G05D 23/1917
(Continued)

(56) References Cited

U.S. PATENT DOCUMENTS 5,395,042 A * 3/1995 Riley et al. .................. 236/46 R
5,621,654 A 4/1997 Cohen et al.
(Continued)

FOREIGN PATENT DOCUMENTS

AU WO2011/072332 A1 * 6/2011 ............ F24F 11/053
DE 10226755 2/2004
(Continued)

OTHER PUBLICATIONS

Mozer, Michael C., "The Neural Network House: An Environment that Adapts to its Inhabitants", 1998, AAAI Technical Report, SS-98-02, pp. 1-5.*

*Primary Examiner* — Kenneth M Lo
*Assistant Examiner* — Alan Chu
(74) *Attorney, Agent, or Firm* — Brooks, Cameron & Huebsch, PLLC

(57) ABSTRACT

A thermal control system for a building is disclosed, which includes a regression model: Given a forecast temperature outside the building, the regression model predicts how much an HVAC system will cost to run during a day, for a given set of time-varying target temperatures for all the thermostats in the thermal control system. The thermal control system may also include an optimizer, which invokes multiple applications of the regression model. Given a forecast temperature outside the building, the optimizer predicts an optimal set of time-varying target temperatures for all the thermostats in the thermal control system. Running the HVAC system with the optimal set of time-varying target temperatures should have a reduced or a minimized cost, or a reduced or minimized total energy usage. The optimizer works by running the regression model repeatedly, while adjusting the time-varying target temperature for each thermostat between runs of the model.

20 Claims, 12 Drawing Sheets

(51) Int. Cl.
*F24F 11/00* (2006.01)
*G06Q 10/06* (2012.01)
*G06Q 30/02* (2012.01)
*G06Q 50/06* (2012.01)

(52) U.S. Cl.
CPC ......... *G06Q 10/06* (2013.01); *G06Q 30/0283* (2013.01); *G06Q 50/06* (2013.01); *F24F 2011/0058* (2013.01); *F24F 2011/0061* (2013.01)

(58) Field of Classification Search
USPC .................. 700/276, 277, 278; 236/1 B, 1 C
See application file for complete search history.

(56) References Cited

U.S. PATENT DOCUMENTS

| | | | |
|---|---|---|---|
| 5,877,957 A * | 3/1999 | Bennett | 700/86 |
| 5,924,486 A * | 7/1999 | Ehlers et al. | 165/238 |
| 6,098,893 A | 8/2000 | Berglund et al. | |
| 6,671,585 B2 | 12/2003 | Lof et al. | |
| 6,745,105 B1 | 6/2004 | Fairlie et al. | |
| 7,069,161 B2 | 6/2006 | Gristina et al. | |
| 7,343,226 B2 * | 3/2008 | Ehlers et al. | 700/276 |
| 7,406,364 B2 | 7/2008 | Andren et al. | |
| 7,516,106 B2 | 4/2009 | Ehlers et al. | |
| 7,741,730 B2 | 6/2010 | Level et al. | |
| 7,848,900 B2 | 12/2010 | Steinberg et al. | |
| 7,873,442 B2 | 1/2011 | Tsui | |
| 7,894,943 B2 | 2/2011 | Sloup et al. | |
| 7,949,615 B2 | 5/2011 | Ehlers et al. | |
| 8,078,330 B2 | 12/2011 | Brickfield et al. | |
| 2003/0009401 A1 | 1/2003 | Ellis | |
| 2003/0023540 A2 | 1/2003 | Johnson et al. | |
| 2006/0167591 A1 | 7/2006 | McNally | |
| 2007/0179855 A1 | 8/2007 | Rueda et al. | |
| 2008/0033786 A1 | 2/2008 | Boaz et al. | |
| 2008/0105045 A1 | 5/2008 | Woro | |
| 2009/0171506 A1 * | 7/2009 | Donaldson et al. | 700/277 |
| 2009/0313056 A1 | 12/2009 | Beckhuis | |
| 2009/0313083 A1 | 12/2009 | Dillon et al. | |
| 2009/0319090 A1 | 12/2009 | Dillon et al. | |
| 2010/0076835 A1 | 3/2010 | Silverman | |
| 2010/0106332 A1 * | 4/2010 | Chassin | G06Q 20/102 700/278 |
| 2011/0046805 A1 | 2/2011 | Bedros et al. | |
| 2011/0106328 A1 | 5/2011 | Zhou et al. | |
| 2011/0184562 A1 * | 7/2011 | Amundson et al. | 700/276 |
| 2011/0246155 A1 * | 10/2011 | Fitch et al. | 703/6 |
| 2012/0153725 A1 * | 6/2012 | Grohman | 307/39 |
| 2012/0179298 A1 * | 7/2012 | Ha | G05B 19/042 700/276 |

FOREIGN PATENT DOCUMENTS

| | | |
|---|---|---|
| EP | 2336834 | 6/2011 |
| WO | 03023675 | 3/2003 |
| WO | 2010131262 | 11/2010 |

* cited by examiner

| Original profile | | | | | |
|---|---|---|---|---|---|
| 65°F | 55°F | 73°F | 74°F | 83°F | 80°F |

New time of change added

| 65°F | 55°F | 55°F | 73°F | 74°F | 83°F | 80°F |
|---|---|---|---|---|---|---|

Changes in two zones independent

| 65°F | 55°F | 73°F | 74°F | 83°F | 80°F |
|---|---|---|---|---|---|
|  |  | 73°F |  |  |  |

Figure 10

HVAC CONTROLLER WITH REGRESSION MODEL TO HELP REDUCE ENERGY CONSUMPTION

TECHNICAL FIELD

The disclosure relates generally to controllers for HVAC systems.

BACKGROUND

HVAC systems are commonly used to control the temperature and/or other environmental conditions within a building. The cost to operate such HVAC systems is typically dependent upon a number of factors including, for example, the scheduled set points used during occupied and unoccupied time periods, the temperature, humidity, sun exposure, wind and/or other environmental conditions outside of the building, energy prices, renewable energy generation capacity, as well as other factors, some or all of which may change during the course of a day. What would be desirable is a controller that can efficiently take into account some or all of these factors to further reduce the cost associated with operating an HVAC system.

SUMMARY

The disclosure relates generally to HVAC controllers for HVAC systems, and more particularly, to HVAC controllers that include a regression model to help reduce energy consumption.

An embodiment is a controller for an HVAC system of a building. The controller includes an input for receiving a forecast of an ambient temperature outside of the building. The controller further includes a memory for storing measures of past operational costs of the HVAC system in conjunction with past operating conditions. The controller further includes an output for setting a set-point of the HVAC system. The controller further includes a control unit coupled to the memory, the input and the output. The control unit includes a regression model that uses the forecast of the ambient temperature and at least some of the measures of past operational costs of the HVAC system in conjunction with past operating conditions to produce a temperature profile that includes one or more future temperature set-points for the HVAC system. The one or more temperature set-points are set to occur at predefined future times. The regression model calculates the temperature set-point values at each of the predefined future times but the regression model does not itself calculate the predefined future times. The control unit forwards the one or more temperature set-points to the HVAC system via the output of the controller.

Another embodiment is a controller for an HVAC system of a building. The controller includes an input for receiving a forecast of an ambient condition outside of the building. The controller further includes a memory for storing defined comfort limits within the building that change with time. The controller further includes an output for setting a set-point of the HVAC system. The controller further includes a control unit coupled to the memory, the input and the output. The control unit executes a regression model that uses the forecast of the ambient condition and the defined comfort limits to produce a profile that includes one or more calculated set-points for the HVAC system that are within the defined comfort limits. The one or more calculated set-points are forwarded to the HVAC system via the output of the controller.

A further embodiment is a method for controlling an HVAC system of a building. A forecast of an ambient temperature outside of the building is obtained. A measure of past operational cost of the HVAC system in conjunction with past operating conditions is obtained. The forecasted ambient temperature and the measure of past operational cost of the HVAC system in conjunction with past operating conditions to a regression model are input. A temperature profile that includes one or more future temperature set-points for the HVAC system is produced. The one or more future temperature set-points are set to occur at predefined future times. The one or more temperature set-points to the HVAC system are output.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following description of various embodiments in connection with the accompanying drawings, in which:

FIG. 10 is an example of the model refinement noted in FIG. 9.

Figure 1:
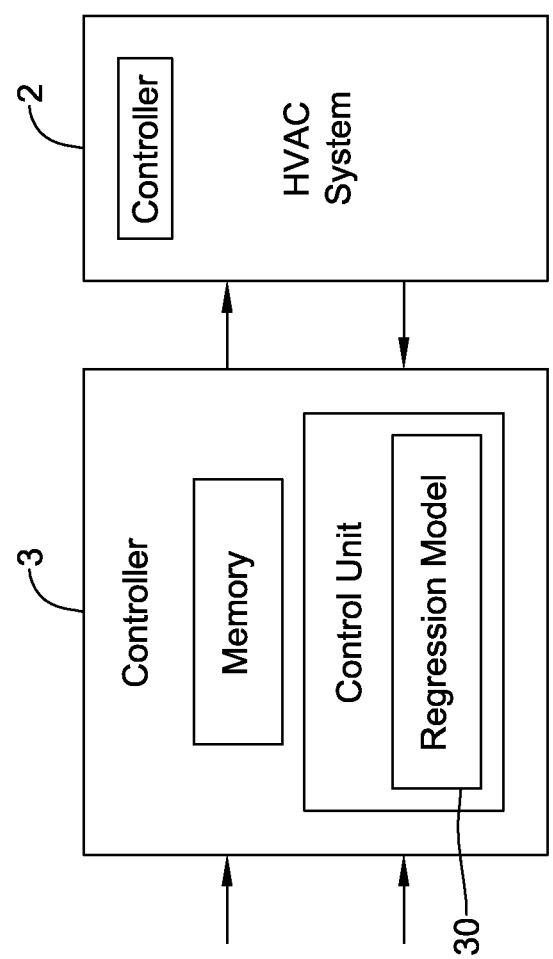
FIG. 1 is a schematic view of an illustrative but non-limiting HVAC system and a corresponding controller.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative in nature.

FIG. 1 is a schematic view of an HVAC system 2 and a corresponding controller 3. The controller 3 includes memory, and includes a control unit that includes a regression model. The controller 3 receives input from outside the HVAC system 2, and can communication in both directions with the HVAC system 2. All of these elements are described in more detail in the text that follows.

Figure 2:
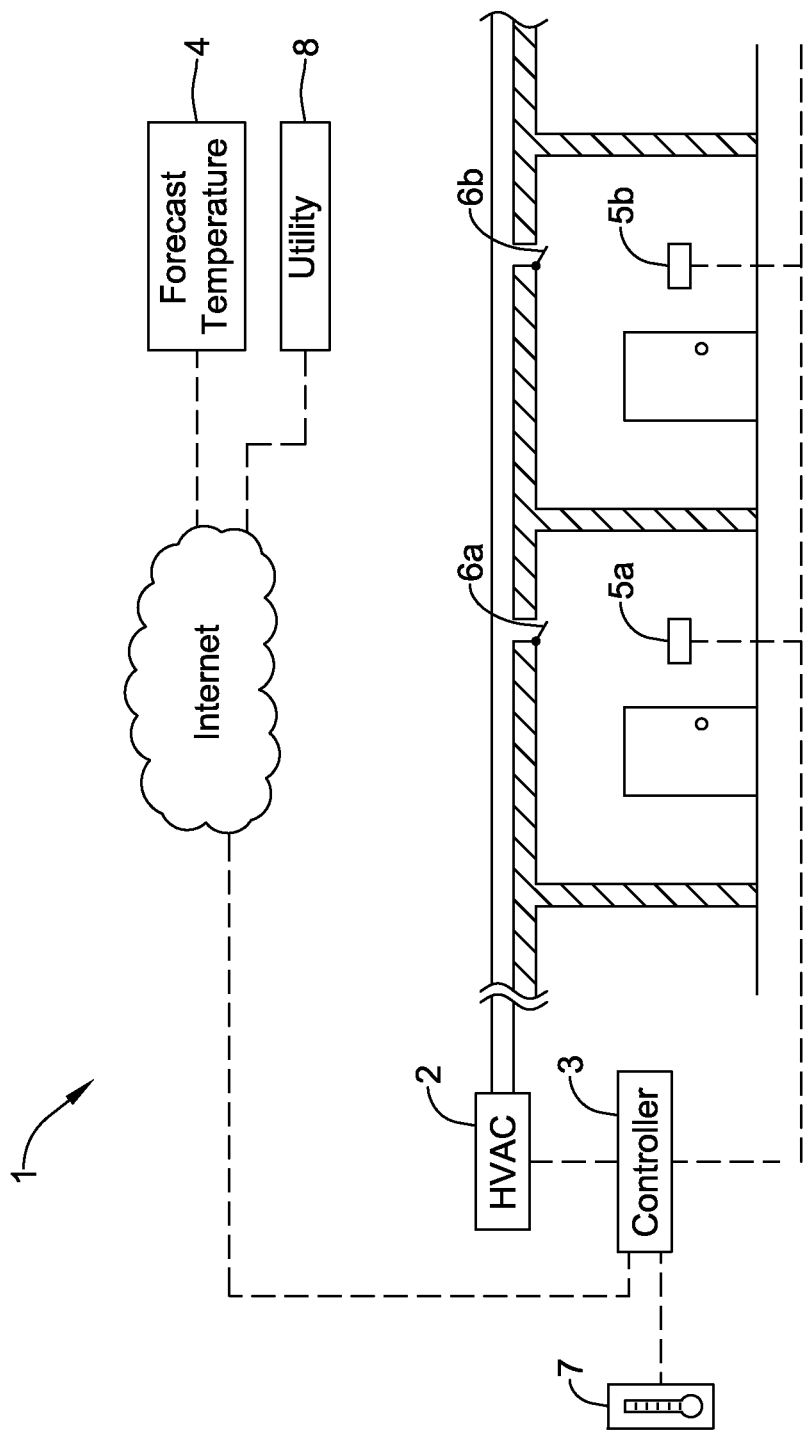
FIG. 2 is a schematic view of an illustrative but non-limiting thermal control system having an HVAC system and a controller.

FIG. 2 is a schematic view of an illustrative thermal control system 1 having an HVAC system 2 and a controller 3. The thermal control system 1 is intended for use in a building, typically a fairly large and/or complex building that may have one or more floors, one or more rooms, and may optionally have work areas or machinery that may generate heat.

The HVAC system 2 has at least one thermostat, and typically includes multiple thermostats 5a, 5b that are distributed throughout the building. The thermostats 5a, 5b are shown in FIG. 2 as being in separate rooms separated by a wall, although in practice they may also appear singly or multiply in central areas that are not separated by a wall. The thermostats 5a, 5b may also appear in different floors of the building.

The thermostats 5a, 5b are connected to the HVAC system 2 in a known manner. Each thermostat has a target temperature that is controlled by the controller 3. The target temperatures of the thermostats 5a, 5b are all time-variable, and are adjustable through respective output signals from the controller 3. The output signals may be produced by the controller 3 and may exit the controller 3 through at least one output terminal. The output terminal may be an internet connection or any suitable network connection, or may alternately use a collection of dedicated wiring that extends throughout the building. The output signals deliver the time-varying target temperatures to the respective thermostats 5a, 5b.

Similarly, the thermostats 5a, 5b communicate to the HVAC system 2 when the temperature in a particular location should be raised or lowered. This information is received through at least one input terminal of the controller 3. The information may be passed as an on/off flag, where the thermostats perform their own comparisons of target and actual temperatures. Alternatively, the information may be passed as an actual temperature, where the comparisons are performed at the controller 3. The input terminal may be an internet connection or any suitable network connection, or may alternately use a collection of dedicated wiring that extends throughout the building. In some cases, the input and output terminals are the same, such as for a two-way internet connection.

Each thermostat 5a, 5b also has a temperature sensor or thermometer. When the sensed temperature differs from the target temperature, the thermostat triggers the HVAC system 2, which can open and close respective baffles 6a, 6b near the thermostats 5a, 5b, and may optionally trigger radiators near the thermostats 5a, 5b. In general, the HVAC system 2 may control the temperature in a known manner, using known ductwork, valves, baffles and radiators. In general, the controller 3 described herein may be used with any suitable HVAC system 2 that has multiple thermostats 5a, 5b in multiple locations.

The thermostats 5a, 5b typically allow a small, predefined range of acceptable temperature differences between the sensed and target temperatures, so that the HVAC system 2 does not cycle on and off too frequently. The small range is often on the order of 0.25 degrees F., 0.5 degrees F., or 1 degree F., although other values may be used.

It is assumed for this application that the response times of the HVAC system 2 are relatively short. More specifically, if the HVAC system 2 receives a signal from one of the thermostats that the temperature near the thermostat should be raised or lowered, it is assumed that the HVAC system 2 responds relatively quickly, typically on the order of a few seconds to a minute, to a few minutes. As a result, it is assumed for this application that as the target temperatures of each thermostat vary over the course of a day, the actual temperature near the thermostat is held relatively close to the target temperature by the HVAC system 2.

As described in more detail below, it is intended that the controller 3 be able to adjust the target temperatures of the thermostats 5a, 5b in response to outside temperatures, i.e., the ambient temperature outside the building. More specifically, it is intended that controller assemble the target temperature 5a, 5b in advance, rather than on-the-fly, in order to improve efficiency in energy usage. As a result, the controller 3 receives at one of its input terminals a forecast temperature 4, which may be retrieved through the internet or may be input by any suitable method. In some cases, the forecast temperature 4 may include the ambient temperature outside the building on a periodic basis, such as hour-by-hour. In other cases, the forecast temperature 4 may include discrete but non-periodic times, such as at the typical start and end of a workday, and so forth. In still other cases, the forecast temperature 4 may include only a daytime high temperature and overnight low temperature. In some cases, in addition to forecast temperature 4, the controller may also receive information about humidity, precipitation and/or cloud cover.

Optionally, in order to assemble accurate data sets that may be used to build a regression model (as described below), it may also be desirable to take measurements of the actual ambient temperature outside the building. Accordingly, the controller 3 may also be connected to a thermometer 7 or other temperature-measuring device. The actual ambient temperature recorded by the thermometer 7 may also be periodic, may be at discrete but-non-periodic times, or may include only a daytime high temperature and overnight low temperature. For forming the regression model, in cases where the actual temperature is not used, the forecast temperature 4 may be used instead.

For calculations of cost, it may be beneficial to record any changes in utility rates that occur at particular times during the day. For instance, the cost of electricity may increase at the onset of afternoon peak hours, and may decrease afterwards in the evening. In order to schematically show the variability in cost as a function of time, the utility 8 is shown as being connected to the internet, through which the controller 3 may obtain the necessary information.

Figure 3:
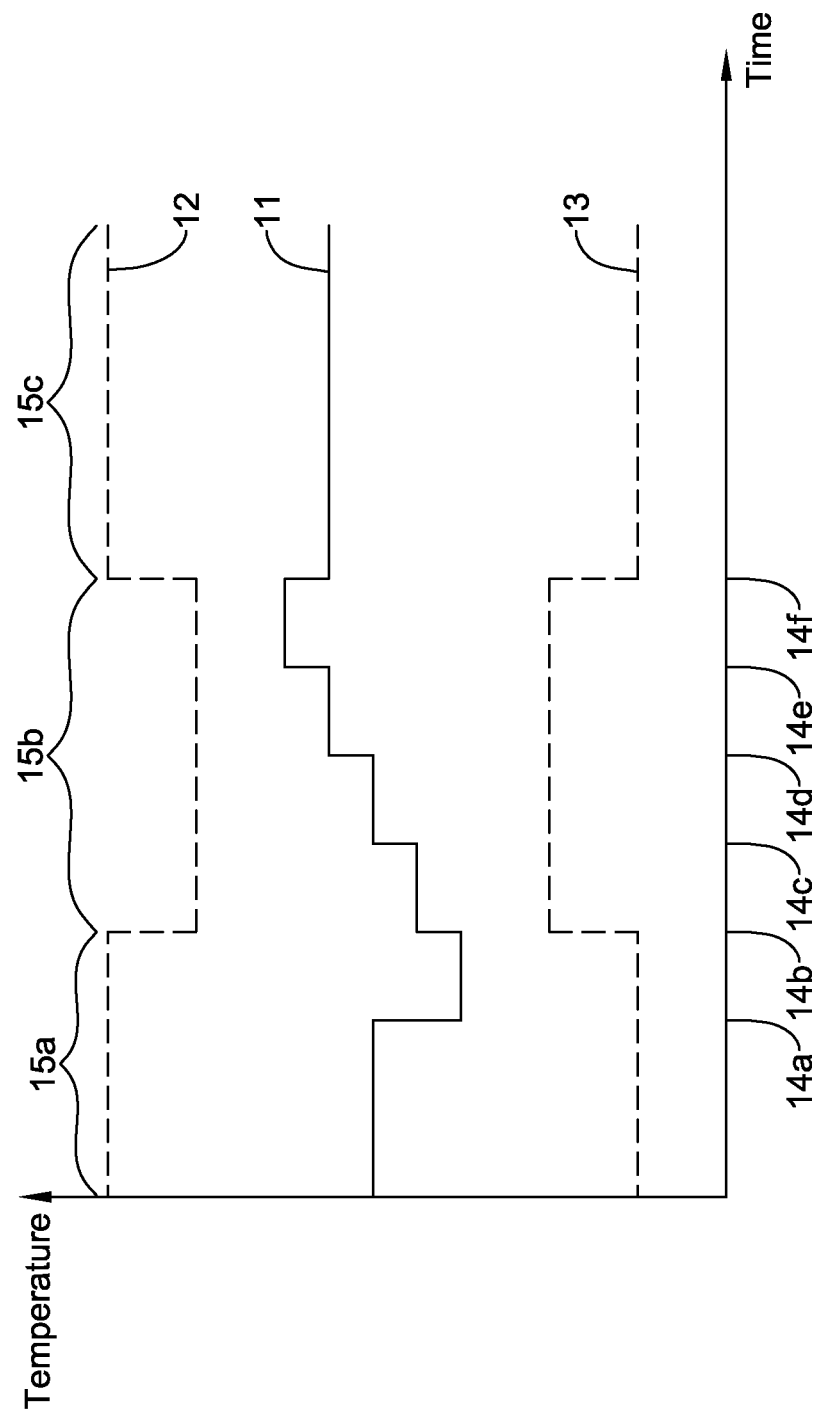
FIG. 3 is an illustrative but non-limiting plot of time-varying target temperature of an example thermostat, and example time-varying upper and lower comfort limits for the controller of FIG. 2.

FIG. 3 is a an illustrative plot of time-varying target temperature 11 of an example thermostat, and example time-varying upper 12 and lower 13 comfort limits for the controller 3 of FIG. 2.

The example time frame shown in FIG. 3 is broken up into a time 15b during which the building is occupied, and times 15a, 15c at which the building is unoccupied. When the building is expected to be occupied 15b, such as during a typical workday, the temperature in the building is generally held to within a relatively narrow region of comfort. During the unoccupied times 15a, 15c, the building temperature is allowed to vary beyond what the relatively narrow region of comfort, over a relatively wide temperature range. For instance, during the winter, regions in the building may be allowed to cool down at night, when it is expected that no one will be around to work in such uncomfortably cool temperatures. In some cases, such as for a typical office building, the times 15a, 15b, 15c are all the same for all the thermostats 5a, 5b in the building. In other cases, different thermostats may be in locations that have different work hours, so that the times 15a, 15b, 15c may be different for some or all of the thermostats. For instance, the building may include a manufacturing areas that run in shifts, so that the occupied times 15b may be staggered or adjusted as needed. For an area of the building that runs around-the-clock, there may be only a single occupied region 15b and no unoccupied regions 15a, 15c.

The region of comfort is denoted by a lower comfort limit 13 and an upper comfort limit 12. Both limits 12, 13 are time-varying, with the narrower region between them occurring when the building is expected to be occupied 15b. Although the lower 13 and upper 12 comfort limits are shown in FIG. 3 as having single values that correspond to the occupied 15b and unoccupied 15a, 15c times, the lower 13 and upper 12 comfort limits may optionally include stepped values and/or continuous increases or decreases. In general, the upper comfort limit 12 may be greater than at least one of the lower comfort limit 13 values, and the lower comfort limit 13 may be less than at least one of the upper comfort limit 12 values. In general, the lower 13 and upper 12 comfort limits are predefined, and typically do not vary from workday to workday. In some cases, the limits 12, 13 may be the same for all the thermostats 5a, 5b in the building. In other cases, some or all of the limits 12, 13 vary from thermostat 5a to thermostat 5b.

The target temperature 11 and, because the HVAC system 2 follows the target temperature 11, the actual temperature proximate the thermostat, both vary over time but are constrained to be between the lower 13 and upper 12 comfort limits at all times. In the example of FIG. 3, the target temperature 11 is allowed to rise over the course of the time 15b during which the building is occupied. Typically, such a time 15b falls during daylight hours, and as a result, allowing the temperature to rise along with a rise in outdoor temperature may decrease the load on the HVAC system 2, and may reduce the energy usage and the cost of running the HVAC system 2.

In order to simplify the parameters used for the regression model (described in detail below), the thermal control system 1 imposes some particular constraints. For instance, the target temperature 11 in the example of FIG. 3 may change only at one of predefined adjustment times 14a-14f, and remains constant between the adjustment times 14a-14f. It is understood that the target temperature 11 does not have to change at every adjustment time 14a-14f, but is free to do so according to the model. In general, the time-varying target temperature 11 may be different for some or all of the thermostats 5a, 5b in the building.

In the example of FIG. 3, the adjustment times 14a-14f are two hours apart, with adjustment times 14b, 14f corresponding to the beginning and end of the occupied time 15b, and the first adjustment time 14a falling two hours before the beginning of the occupied time 15b. In the time between times 14a and 14b, the HVAC system 2 may be run to achieve precooling or preheating of a particular are in the building. Such precooling or preheating may be done in advance of peak hours, which may provide a cost savings if the utility company charges more for power during peak hours.

In some cases, the sets of adjustment times 14a-14f are the same for all thermostats 5a, 5b in the building. In other cases, the sets of adjustment times 14a-14f are different for at least one of the thermostats 5a, 5b in the building. For example, if there are staggered work hours for different areas in the building, the adjustment times may also be staggered to coincide with the different sets of work hours. As another example, different zones may have a difference in orientation and exhibition to solar radiation.

At this point, it is instructive to summarize the function of the regression model in the controller 3.

First, we describe the use of a single application of the regression model: Given a forecast temperature outside the building, the regression model predicts how much the HVAC system 2 will cost to run during a day, for a given set of time-varying target temperatures 11 for all the thermostats 5a, 5b in the thermal control system 1. Note that the energy use is indirectly determined as a function of time, so if the utility company charges more for power during particular peak hours, this may be easily accounted for by the model, and the model may calculate total cost, in dollars, for running the HVAC system 2, rather than total energy usage. In general, both cost and total energy usage may be considered measures related to energy consumption.

Next, we describe the use of an optimizer, which invokes multiple applications of the regression model: Given a forecast temperature outside the building, the optimizer determines an optimal set of time-varying target temperatures 11 for all the thermostats 5a, 5b in the thermal control system 1. Running the HVAC system 2 with the optimal set of time-varying target temperatures 11 should have a reduced or a minimized cost, or a reduced or minimized total energy usage. The optimizer works by running the regression model repeatedly, while adjusting the time-varying target temperature 11 for each thermostat 5a, 5b between runs of the model. Specifically, in the example of FIG. 3, the optimizer adjusts the constant temperature values up and down as needed, but leaves the adjustment times 14a untouched. Eventually, the regression model may converge to a local or global minimum in cost or total energy usage. The optimizer may return the sequence of time-varying target temperatures 11 that produce such a minimum in cost or total energy usage.

Figure 6:
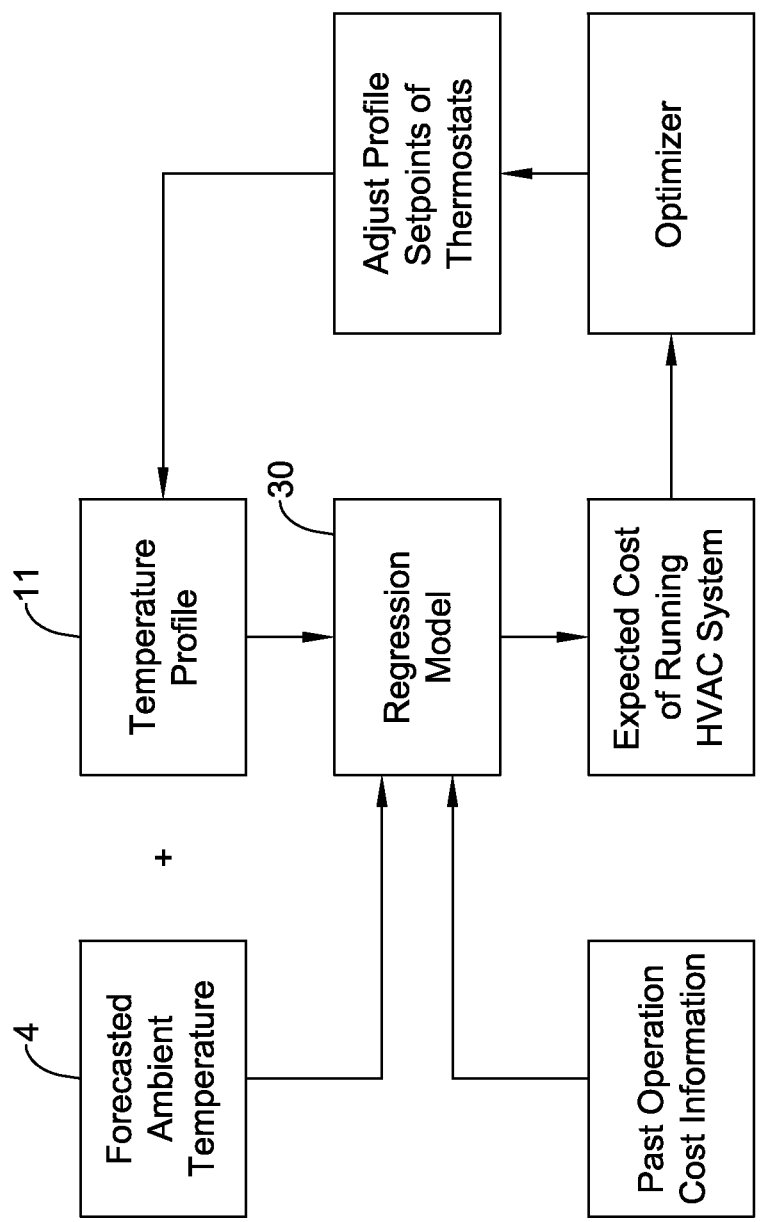
FIG. 6 is a flow diagram of an illustrative but non-limiting optimizer that performs multiple use of the regression model of FIG. 4 for the controller of FIG. 2.
Figure 7:
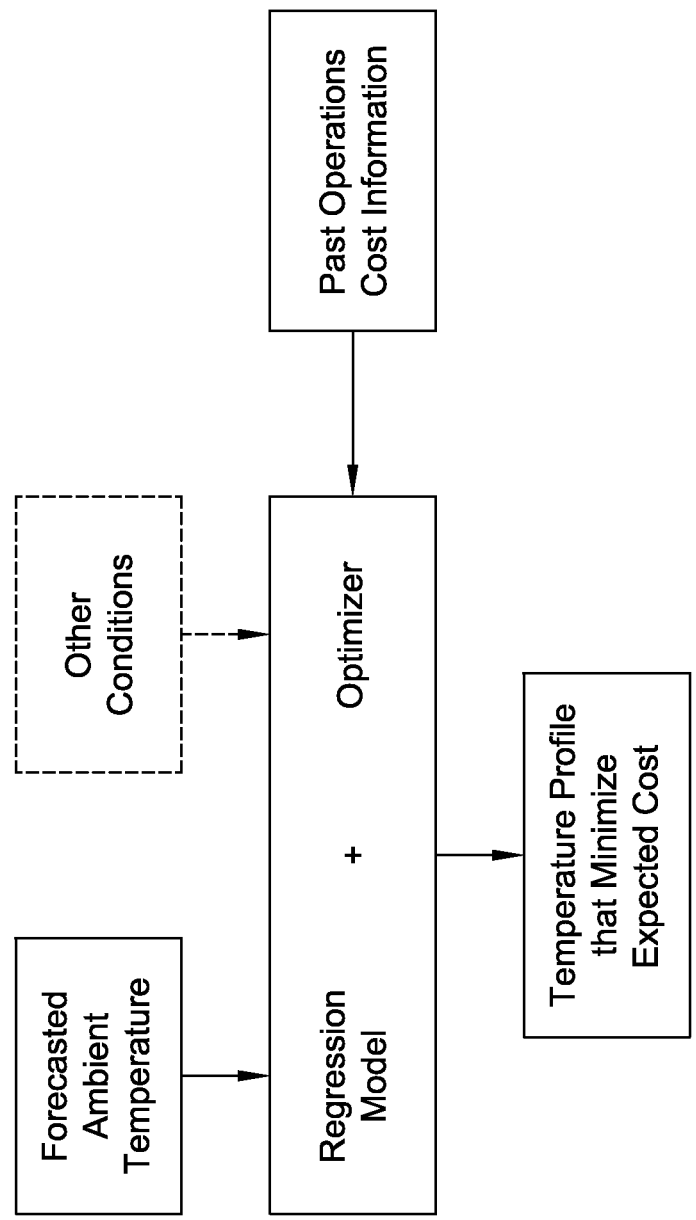
FIG. 7 is a flow diagram of an illustrative but non-limiting prediction from use of the optimizer of FIG. 6 with the regression model of FIG. 4 for the controller of FIG. 2.

Having summarized the general functions of the regression model in the controller 3, we show flow diagrams of the data sets used to build the model (FIG. 4), of a single use of the regression model (FIG. 5), of repeated uses of the regression model as invoked by the optimizer (FIG. 6), and of a use of the combined regression model and optimizer taken together (FIG. 7).

Figure 4:
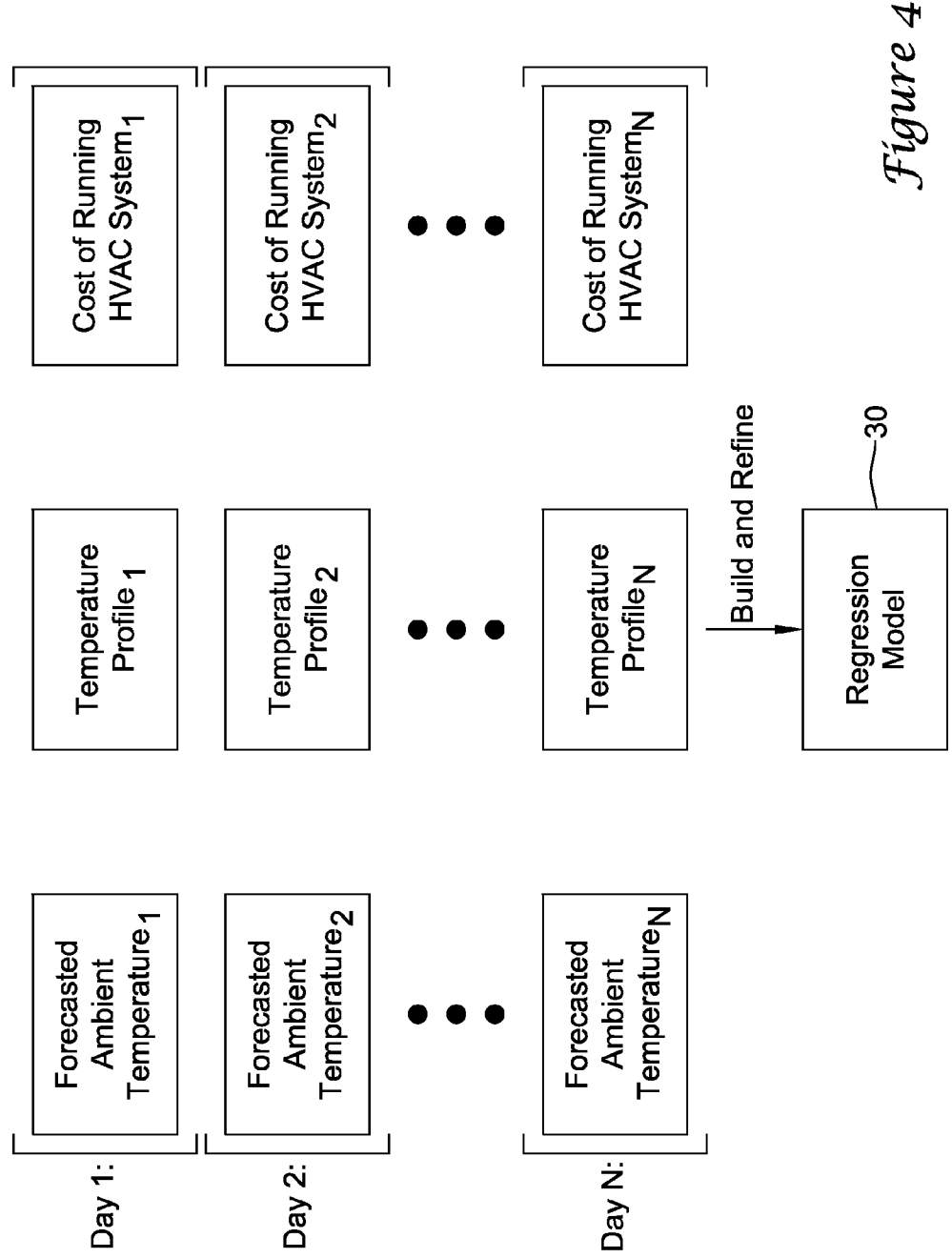
FIG. 4 is a flow diagram of data that forms an illustrative but non-limiting regression model for the controller of FIG. 2.

FIG. 4 is a flow diagram of the data that forms the regression model 30 for the controller 3 of FIG. 2.

The data that forms the model 30 is historical data, which is obtained from running the thermal control system 1 in the past. Data from the past N days is shown in FIG. 4. In practice, running the thermal control system in a slightly random manner, but within the comfort limits 12, 13, for a few days may be enough to the get model 30 up and running.

Data for each day includes the actual ambient temperature outside the building, which is easily obtained by readings from a thermometer placed outside the building, or by connection through the internet in a manner similar to obtaining the forecast temperature 4. In some cases, the forecast temperature 4 may be used instead of the actual temperature. In some cases, the actual temperature is obtained at various times during the day, such as hourly or at the adjustment times 14a-14f.

Data also includes the actual time-varying target temperatures 11 for all the thermostats 5a, 5b in the building. These target temperatures 11 are generated by the controller 3, so historical target temperatures 11 for the particular day are easily obtained from data stored by the controller 3.

Finally, the data also includes the actual cost or total energy usage of running the HVAC system for the particular day. This may be a number generated by the thermal control system 1 or by the utility company. The number may be in units of energy, such as BTUs, or may appear as cost, in dollars, if the utility company has different rates for peak times that are accounted for by the model 30.

There are two example ways for the regression model to treat the utility cost, if such a cost varies over the course of the day. As a first example, the cost may be entered as its own independent input into the regression model, much like the forecast ambient temperature and the day of the week (workday vs. non-workday). This first example is covered by FIG. 5.

As a second example, the prices are applied to the forecasted load. Using the regression model, the loads are measured and modeled not only for the whole day, but for each period when the prices may differ. For example, if the utility company has an elevated price from 1 to 4 PM, the consumption during these hours is considered separately from consumption outside these hours. Both consumptions may be the subject of separate regression models. Consequently, the prices multiply the consumptions. This second example is covered by FIG. 5A.

These three pieces of data for actual usage, taken over several days, forms the regression model 30. Predictions from the model 30 become increasingly reliable as the body of historical data grows. It will be understood that additional information may also be used with the regression model 30, including humidity, cloud cover and/or precipitation.

Ultimately, the model 30 receives input such as the forecasted ambient temperature for a particular day, and generates the setpoints for the thermostats in the building.

Figure 5:
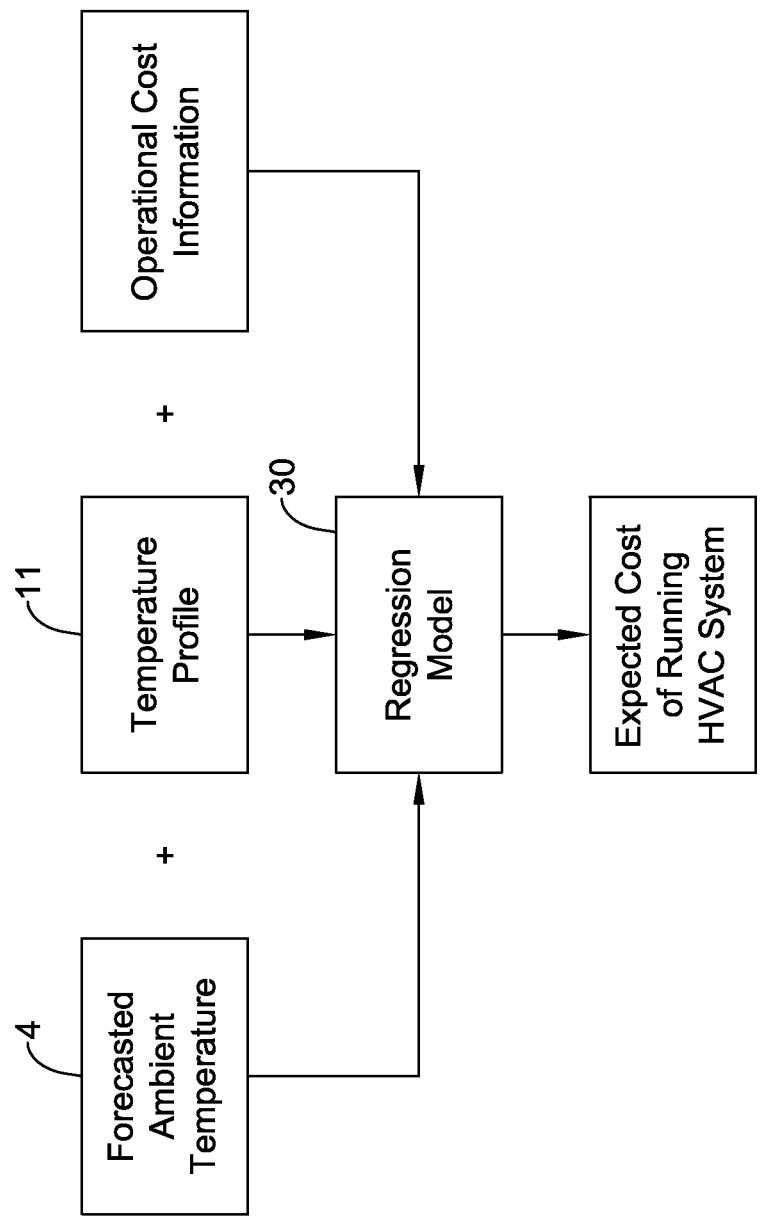
FIGS. 5 and 5A are flow diagrams of illustrative but non-limiting predictions from a single use of the regression model of FIG. 4 for the controller of FIG. 2.
Figure 5A:
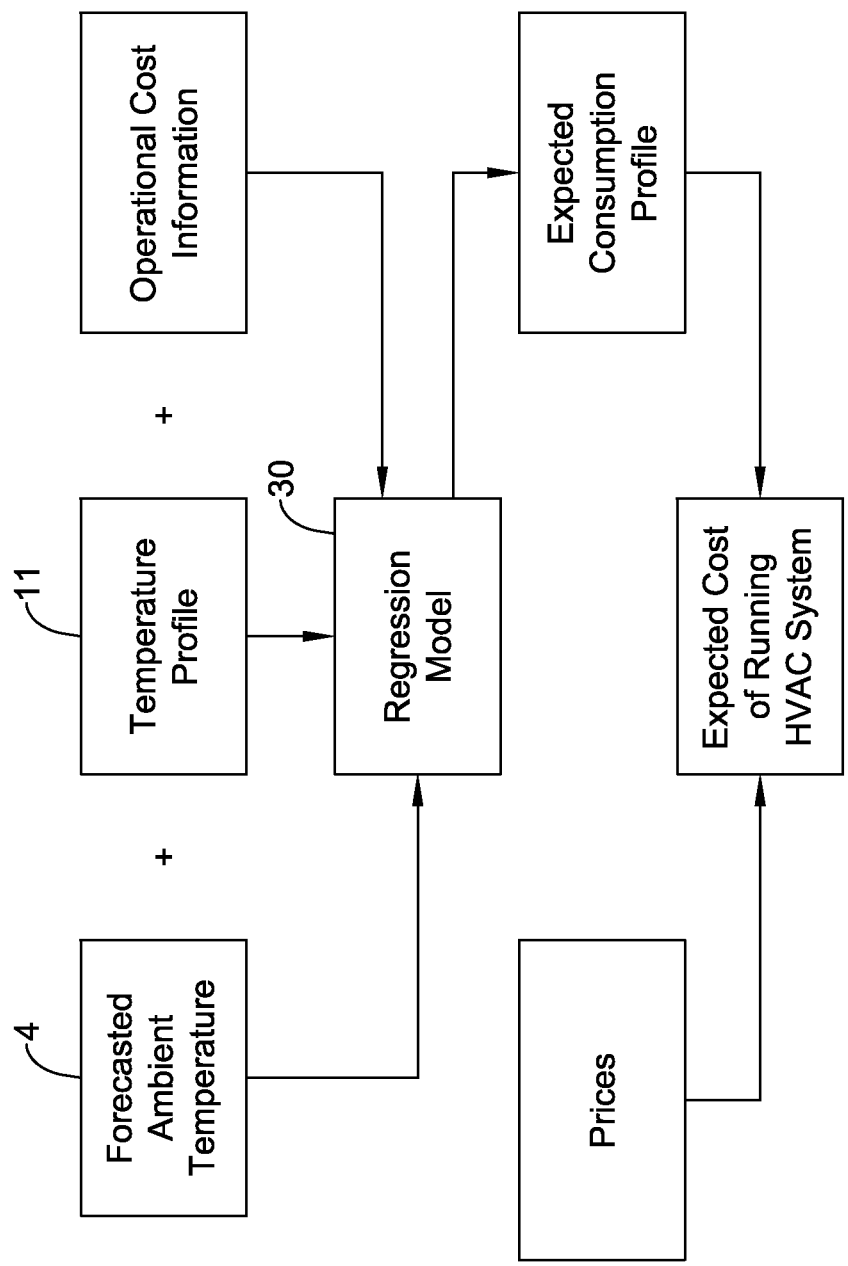

FIGS. 5 and 5A are flow diagrams of a single use of the regression model 30 of FIG. 4 for the controller 3 of FIG. 2.

The model 30 receives as input a forecasted ambient temperature 4 for a particular day, preferably for various times during the day, and a set of temperature profiles for all thermostats 5a, 5b in the building. The set of temperatures may be generated by the optimizer (as shown below), or may be generated at random or by a user. Note that the regression model 30 has received (possibly prior to this single use) past operational cost data information, and that such information is used to build the regression model 30.

Based on the input, the model 30 produces as output a single measured related to energy consumption, such as cost in dollars, or total energy usage in BTU. Essentially, the model 30 predicts what the cost of running the HVAC system 2 would be if the outside temperature were equal to the forecast temperature, and the thermostats 5a, 5b in the building were set according to the expected temperatures.

In most cases, the user will use the model 30 as part of an optimizer process, rather than in a stand-alone, single-use mode. This optimizer process is shown schematically in FIG. 6.

FIG. 6 is a flow diagram of an optimizer that performs multiple use of the regression model 30 of FIG. 5 for the controller of FIG. 2. Such an optimizer adjusts the expected time-varying target temperatures 11 of all the thermostats 5a, 5b, in order to reduce or minimize the expected cost of running the HVAC system 2 for the day. For such an optimizer, the cost or total energy usage is considered to be the figure of merit. Similarly, the adjustable parameters are taken to be the target temperatures 11 of all the thermostats 5a, 5b in the building.

For the example optimizer of FIG. 6, only the temperature profiles are adjusted; the adjustment times 14a-14f, as shown in FIG. 3, are not adjusted by this configuration of the optimizer. In other configurations, there may be more degrees of freedom, which may include allowing the adjustment times to move, adding more adjustment times, allowing a temperature to ramp up or down continuously rather than remain constant, and so forth.

In general, any suitable optimization technique may be used, including simulated annealing, quantum annealing, tabu search, stochastic gradient descent, graduated optimization, ant colony optimization, particle swarm optimization, and others.

When the regression model and optimizer are used together, the process may be largely transparent to the user. FIG. 7 is a flow diagram of use of the optimizer of FIG. 6 with the regression model of FIG. 4 for the controller of FIG. 2. This process more closely resembles the day-to-day usage of the regression model, from the point of view of the user.

A typical user would want to use the model to predict the thermostat temperatures for the next day. The regression model and optimizer receives a forecast ambient temperature, in some cases from an internet-based data source. Based on the predicted outdoor temperature, the regression model and optimizer generate the time-varying setpoints of the temperature profiles of all the thermostats 5a, 5b in the building. Although not shown in FIG. 7, it is assumed that during the following day, the controller 3 controls the time-varying target temperatures 11 of the thermostats 5a, 5b in accordance with those values that are calculated in FIG. 7.

Note that if the target temperatures 11 are not controlled as such, for example, due to some cycling limitations, it is assumed implicitly that the temperature control remains the same all the time. Alternatively, parameterization of the control may be considered as another external input to the regression model.

Note that when the optimizer adjusts the time-varying target temperatures 11, as shown in FIG. 3, the optimizer ensures that the temperatures are constrained to lie within the comfort limits 12, 13, and that the comfort limits correspond to the building occupancy that is expected for the particular day. In order words, the optimizer knows when the day being calculated is a workday, and can actively ensure that the comfort limits 12, 13 are correct for the expected occupancy state of the day being calculated.

In addition, note that the optimizer may use different risk levels, where a high risk level may have a more likely chance of an unexpectedly high cost. One way of interpreting the risk level is as "risk acceptance", or, in terms of exploring the space for the regression model, "amount of curiosity". A high risk level, or "high curiosity" may be appropriate when the design space is largely unexplored. Running the regression model for these high risk level temperature profiles may involve some unusual choices for the temperature profiles, such as pre-heating a particular area in the morning. We know from experience that it is probably not cost-effective to pre-heat an area (pre-cooling is much more typical), and running a day with such pre-heating may prove to be expensive in terms of energy usage. But having the data in the regression model, even if the data point is known in advance to be sub-optimal, is still a useful exercise and may help fill out the design space for the regression model. In other words, even the deliberately "bad" data is useful for constructing and refining the regression model. Over time, as the design space becomes mapped out by the regression model, the risk acceptance, or "curiosity", may be decreased.

It is important to note that the value at "risk" for the optimizer is cost, and is not temperature. The temperature always, in all cases, remains between the set comfort limits, but the cost of running the HVAC system may be at risk for being high.

Figure 8:
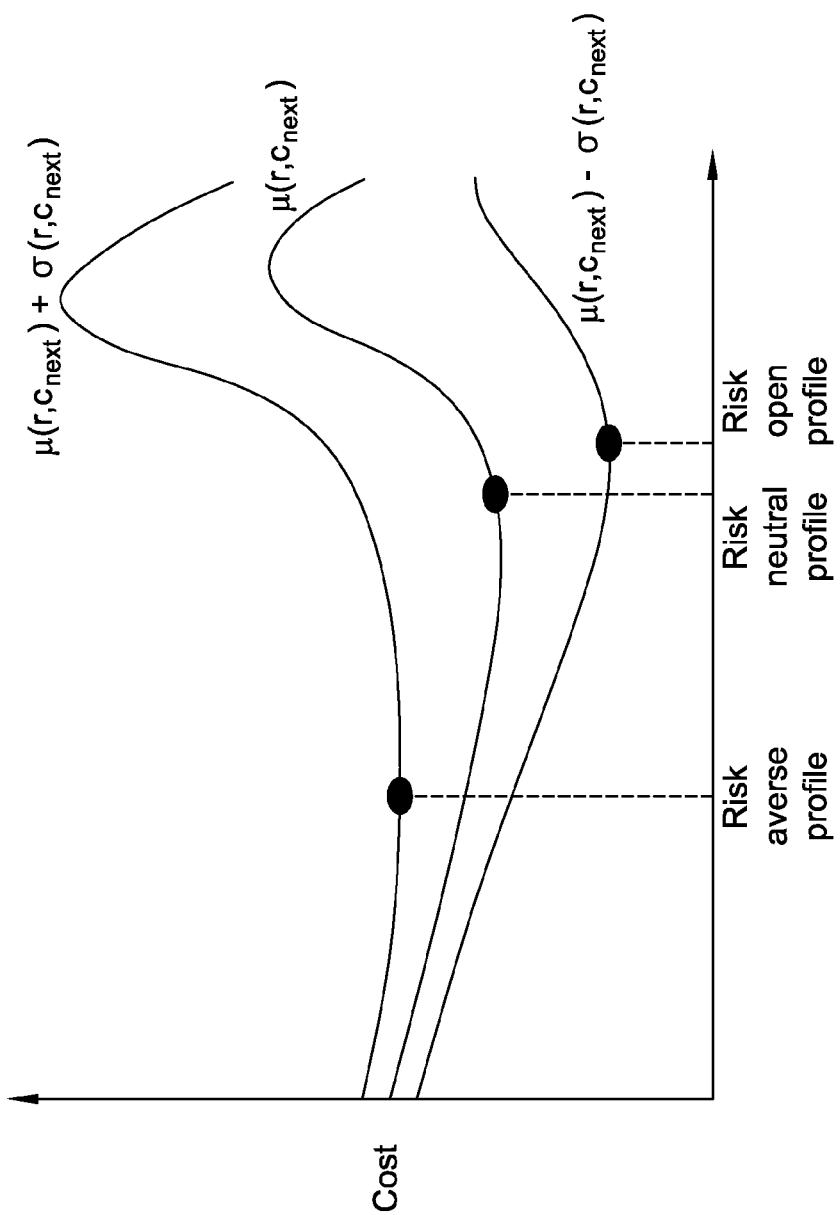
FIG. 8 is an example plot of cost as a function of the temperature setpoints and the conditions.

FIG. 8 is an example plot of cost as a function of the temperature setpoints, represented here as a one-dimensional generalized temperature profile, r, and the conditions, c. Cost increases along the vertical axis. The regression model provides a mean value of predicted cost, $\mu(r,c)$, and a standard deviation of predicted cost, $\sigma(r,c)$.

Of the three curves plotted in FIG. 8 the top curve represents a risk averse profile, in which predicted cost is increased in order to reduce the risk of having the temperature inside the building go outside the comfort zone. The middle curve represents a risk neutral profile, in which the uses the best prediction of the regression model without any extra intended cost savings or any extra intent to ensure that the temperature inside the building remains in the comfort zone. The bottom curve represents a risk open profile, in which the predicted cost is decreases at the expense of increasing the risk that the temperature in the building can go outside the comfort zone.

Mathematically, the curves shown in FIG. 8 may be represented as a mean value, $\mu$, plus a standard deviation, $\sigma$, times a so-called "risk avoidance parameter", $\alpha$:

$$f(r)=\mu(r,c)+\alpha\cdot\sigma(r,c)$$

For the top curve, $\alpha$ is +1. For the middle curve, $\alpha$ is zero. For the bottom curve, $\alpha$ is −1. It will be understood that the plots shown are merely representative of the system behavior and trends, and do not represent real physical temperature or dollar values. Other values of $\alpha$ may be used as needed.

Figure 9:
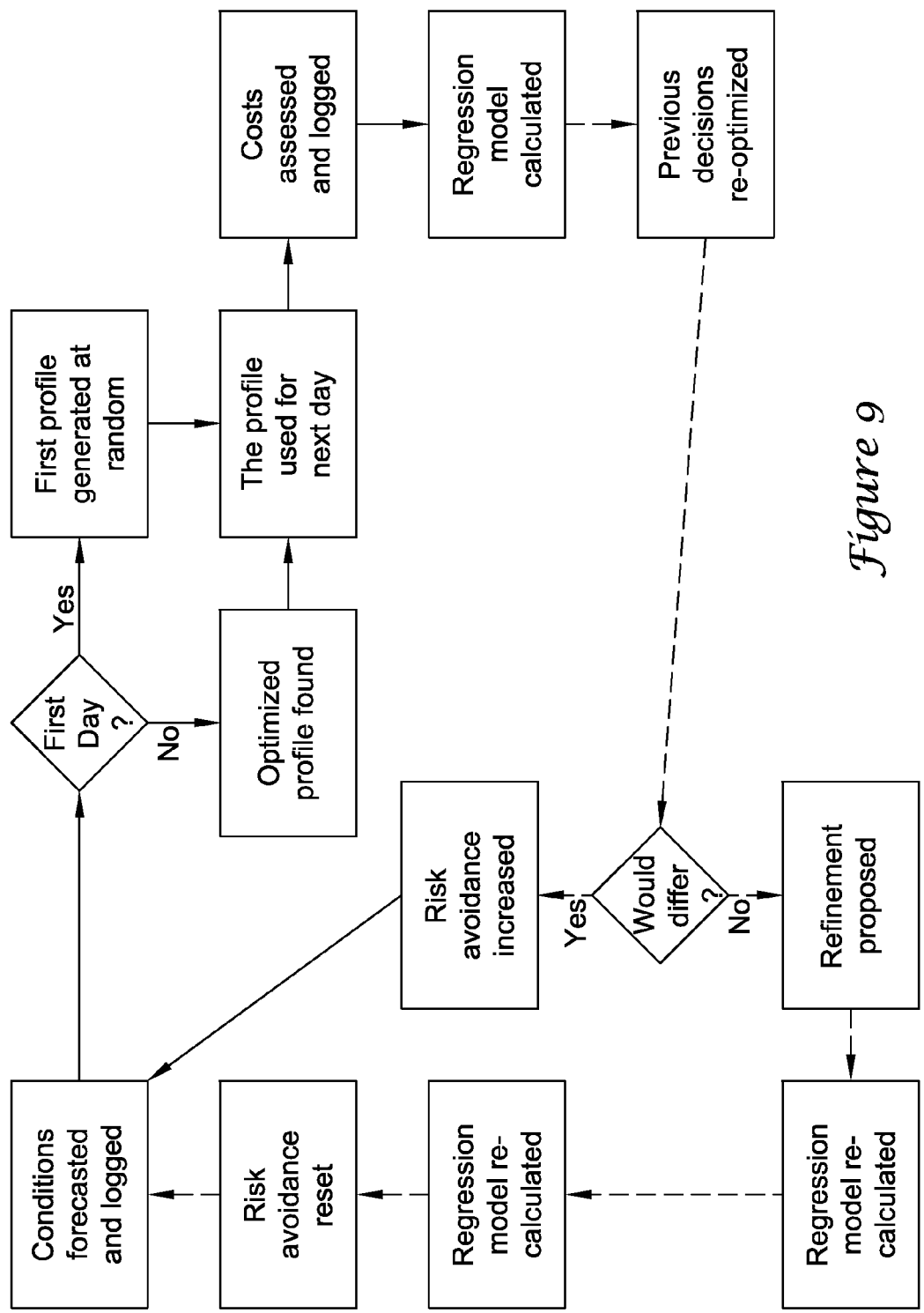
FIG. 9 is a flowchart of an example configuration showing how the regression model and optimizer are built, refined and used on a day-to-day basis.

FIG. 9 is a flowchart of an example configuration showing how the regression model and optimizer are built, refined and used on a day-to-day basis.

Assuming that the system is freshly installed, on its first day, a first profile is generated at random. This profile is used for the next day. Once the day has occurred, with real temperature points being set at particular times, real BTUs being expended by the HVAC system and real dollars being spent to fuel the HVAC system, the costs are assessed and logged. The profiles and costs are fed into the regression model, which incorporates the new data. Once the regression model has been calculated, and the risk avoidance may be increased. For the following day, the conditions forecasted and logged, an optimized profile is found and used, and the cycle repeats as long as the system is used.

In tandem with this loop, the regression model is honed and refined, although this process may be largely transparent to the daily user. After the regression model has been calculate, one or more previous decisions are re-optimized. If, after re-optimization, they would differ from the decisions that were actually chosen, then the risk avoidance may be increased. If, after re-optimization, they remain the same as what was actually chosen, then refinement may be proposed, data may be recalculated, the regression model may be recalculated, and risk avoidance may be reset.

It should be noted that the flowchart of FIG. 9 is just one example of the type of use and refinement process for the regression model. Other uses and refinements may be used as well.

FIG. 10 is an example of the model refinement noted in FIG. 9.

After experiments are run that don't change any recent decisions significantly, it is assumed that the profiles seem to be mature. For these mature profiles, with the existing zones and the existing times at which the setpoints change, there is little prospect of performance improvement.

Therefore, in order to potentially improve performance, one can add a new time of change, can add a new condition, and/or can split a profile for different zones. These cases are shown in FIG. 10.

If the refinement has changed the profiles, so that the optimum profile differs from the optimization before refinement, then the optimized profile can lead to higher savings, and may be accepted. If the refinement does not change the profiles, than another refinement may be tried. This may be repeated as often as desired.

Figure 11:
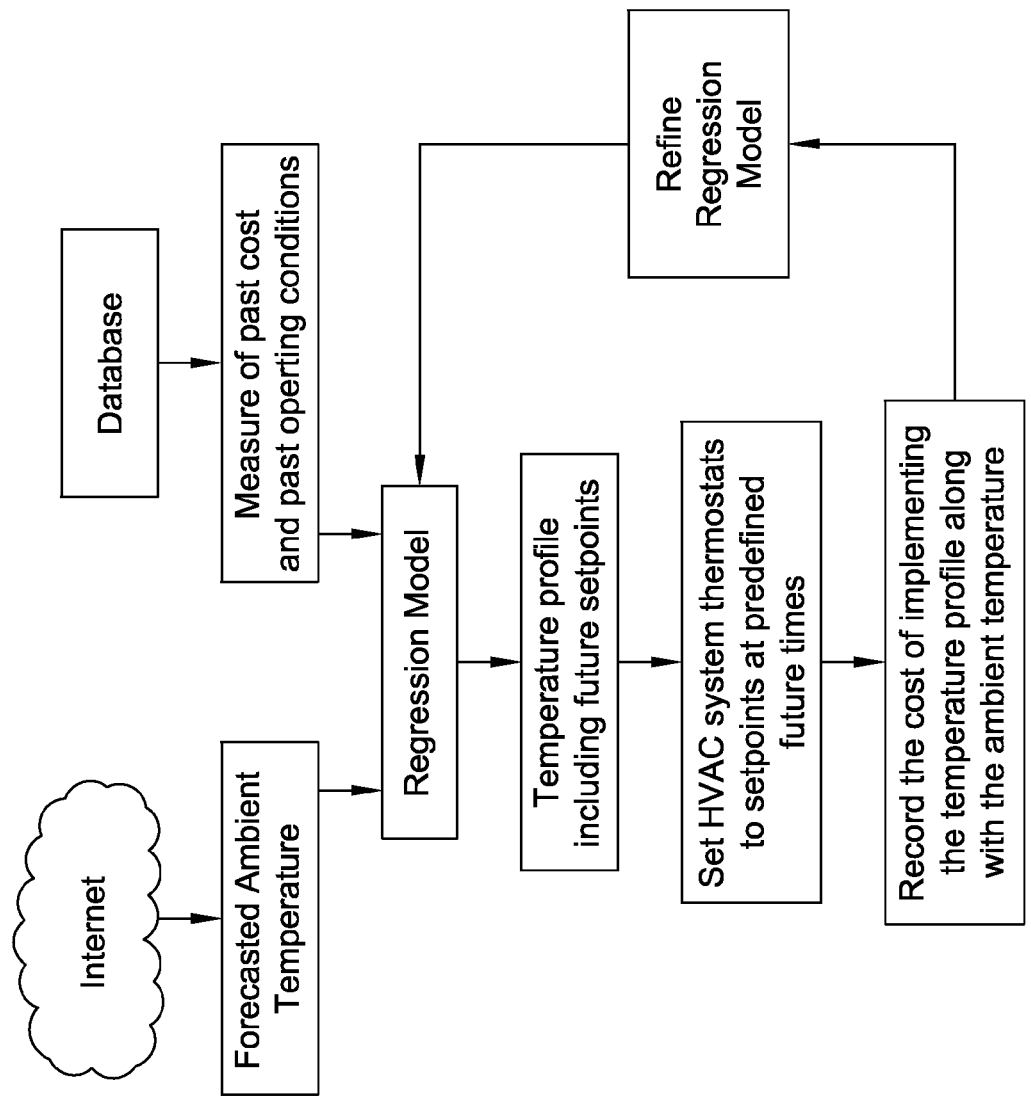
FIG. 11 is a flowchart of another example configuration showing the use and refinement of the regression model.

FIG. 11 is a flowchart of another example configuration showing the use and refinement of the regression model.

A forecast of an ambient temperature outside of the building is obtained, typically from the internet. A measure of past operational cost of the HVAC system in conjunction with past operating conditions is obtained, typically through a database stored locally or remotely on a computer server. The forecasted ambient temperature and the measure of past operational cost of the HVAC system in conjunction with past operating conditions to a regression model are input to the regression model. A temperature profile that includes one or more future temperature set-points for the HVAC system is produced by the regression model. The one or more temperature set-points to the HVAC system are output to the HVAC system, which sets its thermostats to the output set-points at predefined future times. After a predetermined length of time, typically a day, the cost of implementing the temperature profile, along with the ambient temperature, is recorded and stored locally or remotely on a computer server. This information is fed back to the regression model to refine the regression model over time.

Having thus described several illustrative embodiments of the present disclosure, those of skill in the art will readily appreciate that yet other embodiments may be made and used within the scope of the claims hereto attached. It will be understood, however, that this disclosure is, in many respect, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A controller for an HVAC system of a building, the controller comprising:
    an input for receiving a forecast of an ambient temperature outside of the building;
    a memory for storing measures of past operational costs of the HVAC system in conjunction with past operating conditions and defined comfort limits within the building that change with time, wherein the past operational costs include past monetary costs of operating the HVAC system to maintain temperature setpoints within the defined comfort limits, and wherein the defined comfort limits include an upper comfort limit and a lower comfort limit that each change with time based on when the building is expected to be occupied, such that a region between the upper comfort limit and the lower comfort limit is narrower when the building is expected to be occupied than when the building is expected to be unoccupied;

an output for setting a set-point of the HVAC system;

a control unit coupled to the memory, the input and the output, the control unit including an optimizer for a regression model that uses a risk acceptance profile based on the past operational costs of the HVAC system to maintain the temperature setpoints of the HVAC system within the defined comfort limits, the forecast of the ambient temperature, the defined comfort limits, and at least some of the measures of the past operational costs of the HVAC system in conjunction with the past operating conditions to produce a temperature profile that includes a plurality of future temperature set-points for the HVAC system that are within the defined comfort limits, wherein each respective future temperature set-point is set to occur at a different predefined future time for a different area of the building, and the optimizer calculates the temperature set-point values at each different predefined future time, but the optimizer does not itself calculate the different predefined future times;

wherein the risk acceptance profile is defined by: $f(r)=\mu(r,c)+\alpha\cdot\sigma(r,c)$, wherein:
  $f(r)$ is the risk acceptance profile;
  r is a generalized temperature profile;
  c is the past operating conditions;
  $\mu(r,c)$ is a mean value of a predicted operational cost of the HVAC system;
  $\sigma(r,c)$ is a standard deviation of the predicted operational cost of the HVAC system; and
  $\alpha$ is a risk avoidance parameter;

wherein the control unit:
  forwards the plurality of future temperature set-points to the HVAC system via the output of the controller; and
  decreases a risk acceptance level of the risk acceptance profile as the regression model is refined; and wherein the risk acceptance level is based on the risk avoidance parameter.

2. The controller of claim 1, wherein at least some of the plurality of predefined future times of the temperature profile correspond to fixed times during a day.

3. The controller of claim 1, wherein at least some of the plurality of predefined future times of the temperature profile correspond to an event.

4. The controller of claim 3, wherein the event corresponds to sunrise.

5. The controller of claim 3, wherein the event corresponds to sunset.

6. The controller of claim 3, wherein the event corresponds to a utility price change.

7. A controller for an HVAC system of a building, the controller comprising:

an input for receiving a forecast of an ambient condition outside of the building;

a memory for storing past monetary costs of operating the HVAC system in conjunction with past operating conditions and defined comfort limits within the building that change with time, wherein the defined comfort limits include an upper comfort limit and a lower comfort limit that each change with time based on when the building is expected to be occupied, such that a region between the upper comfort limit and the lower comfort limit is narrower when the building is expected to be occupied than when the building is expected to be unoccupied;

an output for setting a set-point of the HVAC system;

a control unit coupled to the memory, the input and the output, the control unit executing an optimizer for a regression model that uses a risk acceptance profile based on the past operational costs of the HVAC system to maintain temperature setpoints of the HVAC system within the defined comfort limits, the forecast of the ambient condition, the defined comfort limits, in conjunction with the past monetary costs of operating the HVAC system, to produce a profile that includes a plurality of future set-points for the HVAC system that are within the defined comfort limits, wherein each respective future set-point is set to occur at a different pre-defined future time for a different area of the building;

wherein the risk acceptance profile is defined by: $f(r)=\mu(r,c)+\alpha\cdot\sigma(r,c)$, wherein:
  $f(r)$ is the risk acceptance profile;
  r is a generalized temperature profile;
  c is the past operating conditions;
  $\mu(r,c)$ is a mean value of a predicted operational cost of the HVAC system;
  $\sigma(r,c)$ is a standard deviation of the predicted operational cost of the HVAC system; and
  $\alpha$ is a risk avoidance parameter;

wherein the plurality of calculated set-points are forwarded to the HVAC system via the output of the controller; and wherein a risk acceptance level of the risk acceptance profile is decreased as the regression model is refined; and wherein the risk acceptance level is based on the risk avoidance parameter.

8. The controller of claim 7, wherein the optimizer for the regression model calculates set-point values for each different predefined future time but the optimizer for the regression model does not itself calculate each different predefined future time.

9. The controller of claim 7, wherein the defined comfort limits change at discrete times, and at least some of the different predefined future times of the profile correspond to at least some of the discrete times of the defined comfort limits.

10. The controller of claim 7, wherein at least some of the different predefined future times of the profile correspond to fixed times during a day.

11. The controller of claim 7, wherein at least some of the different predefined future times of the profile correspond to an event.

12. The controller of claim 11, wherein the event corresponds to sunrise.

13. The controller of claim 11, wherein the event corresponds to sunset.

14. The controller of claim 11, wherein the event corresponds to a utility price change.

15. The controller of claim 7, wherein each of the plurality of set-points of the profile correspond to a temperature set-point that includes a set-point time and a set-point temperature, and wherein the input of the controller receives a forecasted temperature for each of the set-point times of the plurality of temperature set-points.

16. The controller of claim 7, wherein the optimizer for the regression model receives a measure related to the operational cost associated with execution of the profile, and uses the operational cost associated with past profiles, along with the ambient conditions that correspond to past profiles, to help produce the profile in order to help minimize expected operational cost associated with the profile.

17. The controller of claim 16, wherein the measure related to the operational cost associated with execution of the profile includes a percent of time that the HVAC system is in an "on" state during execution of the profile.

18. The controller of claim 16, wherein the regression model calculates a measure related to an expected operation cost of the profile, along with an uncertainty factor of the expected operational cost.

19. A method for controlling an HVAC system of a building, the method comprising:
   obtaining a forecast of an ambient temperature outside of the building;
   obtaining a measure of past operational cost of the HVAC system in conjunction with past operating conditions and defined comfort limits within the building that change with time, wherein the past operational cost includes a past monetary cost of operating the HVAC system, and wherein the defined comfort limits include an upper comfort limit and a lower comfort limit that each change with time based on when the building is expected to be occupied, such that a region between the upper comfort limit and the lower comfort limit is narrower when the building is expected to be occupied than when the building is expected to be unoccupied;
   inputting the forecasted ambient temperature, the defined comfort limits, and the measure of the past operational cost of the HVAC system in conjunction with the past operating conditions to a regression model that uses a risk acceptance profile based on the past operational costs of the HVAC system to maintain temperature setpoints of the HVAC system within the defined comfort limits to produce a temperature profile that includes a plurality of future temperature set-points for the HVAC system that are within the defined comfort limits, wherein each respective future temperature set-point is set to occur at a different predefined future time for a different area of the building;
   wherein the risk acceptance profile is defined by:
      $f(r) = \mu(r,c) + \alpha \cdot \sigma(r,c)$, wherein:
      $f(r)$ is the risk acceptance profile;
      $r$ is a generalized temperature profile;
      $c$ is the past operating conditions;
      $\mu(r,c)$ is a mean value of a predicted operational cost of the HVAC system;
      $\sigma(r,c)$ is a standard deviation of the predicted operational cost of the HVAC system; and
      $\alpha$ is a risk avoidance parameter;
   outputting the plurality of future temperature set-points to the HVAC system; and
   decreasing a risk acceptance level of the risk acceptance profile as the regression model is refined;
   wherein the risk acceptance level is based on the risk avoidance parameter.

20. The method of claim 19, further comprising refining the regression model over time.

* * * * *